United States Patent [19]

Glowaky et al.

[11] 4,061,611
[45] Dec. 6, 1977

[54] AQUEOUS COMPOSITIONS CONTAINING STARCH ESTER DISPERSANTS

[75] Inventors: Raymond Charles Glowaky, Matteson; Stephen Edward Rudolph, Glenwood; Gordon Paul Bierwagen, Homewood, all of Ill.

[73] Assignee: The Sherwin-Williams Company, Cleveland, Ohio

[21] Appl. No.: 725,604

[22] Filed: Sept. 22, 1976

[51] Int. Cl.$^2$ ............................................. C08L 3/06
[52] U.S. Cl. .............................. 260/17.4 ST; 536/107; 536/108
[58] Field of Search ................. 260/17.4 ST; 536/107, 536/108

[56] References Cited

U.S. PATENT DOCUMENTS

| | | | |
|---|---|---|---|
| 2,891,947 | 6/1959 | Paschall et al. | 536/110 |
| 3,557,091 | 1/1971 | Martin et al. | 536/110 |
| 3,652,542 | 3/1972 | Hjermstad et al. | 260/17.4 |
| 4,011,392 | 3/1977 | Rudolph et al. | 536/108 |

FOREIGN PATENT DOCUMENTS

| | | | |
|---|---|---|---|
| 789,003 | 7/1968 | Canada | 536/107 |
| 810,306 | 3/1959 | United Kingdom | 536/110 |

Primary Examiner—Edward M. Woodberry
Attorney, Agent, or Firm—James V. Tura; Richard G. Smith; Neil A. DuChez

[57] ABSTRACT

This invention is directed to aqueous compositions and the process for preparing same and more specifically to aqueous coating compositions comprising polymeric resin binders and pigments dispersed in an aqueous system with starch ester dispersants. The dispersant consists of mixed esters of starch derived from (a) low molecular weight hydrolyzed starch having a plurality of anhydroglucose units or a derivative of said starch and (b) at least about 0.5 mole of acylating agent for each anhydroglucose unit of the hydrolyzed starch or its derivative. The acylating agent is a combination of anhydrides or acyl compounds consisting of (i) from about 0.1 to 2.9 moles of at least one anhydride of a polycarboxylic acid and (ii) from 0.1 to 2.9 moles of at least one compound selected from the class consisting of anhydrides of monocarboxylic acids and the acyl halides of monocarboxylic acids.

22 Claims, No Drawings

AQUEOUS COMPOSITIONS CONTAINING STARCH ESTER DISPERSANTS

BACKGROUND

This invention relates to aqueous compositions, e.g. coating compositions such as latex paints and to the process for preparing dispersions of pigments and polymeric resins in aqueous mediums with a dispersing agent. The dispersing agent consists of mixed esters of starch characterized as having pendant carboxylic acid groups and an average degree of substitution ranging from 0.5 to 3.0 wherein at least about 10 mole percent of the pendant carboxyl groups are neutralized. These mixed esters of starch or dispersants are derived from the low molecular weight hydrolyzed starch molecules having a plurality of anhydroglucose units and a combination of acylating agents consisting of at least one anhydride of a polycarboxylic acid and at least one anhydride of a monocarboxylic acid and/or the acyl halide of said monocarboxylic acid.

The incentive for developing dispersants derived from starch is the uncertainty over the availability of similar materials derived from petrochemicals. A way of avoiding the problems encountered due to shortage of materials prepared from petrochemicals is to diversify the raw materials from which the compounds are derived by relying on agricultural products. These products are renewed on an annual basis and the volume, if necessary, can be expanded in accordance with the demands by merely increasing the acreage. Starch, for example, which is derived from corn, potatoes, rice or the like is presently being produced at rates exceeding ten billion pounds per year and is being used for a variety of industrial purposes. Starch in most instances, however, must be chemically modified, e.g. esterified before products can be obtained with the necessary characteristics and particularly for use in aqueous systems. Low molecular weight starches with high degrees of substitution are not commercially available and for the most part only the high molecular weight starches with low degrees of substitution are being used in most commercial applications.

The standard grade of a high molecular weight starch consists of approximately 80% amylopectin with average molecular weights ranging from 1.0 to 30 million and about 20% of amylose with average molecular weights ranging from about 40,000 to 300,000. The structure of amylopectin and amylose may be illustrated by Formulas I and II wherein n is the number of linear and branched anhydroglucose repeating units.

FORMULA I
AMYLOSE

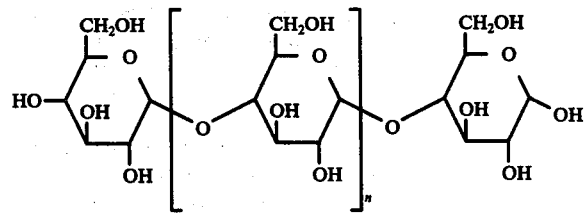

FORMULA II
AMYLOPECTIN

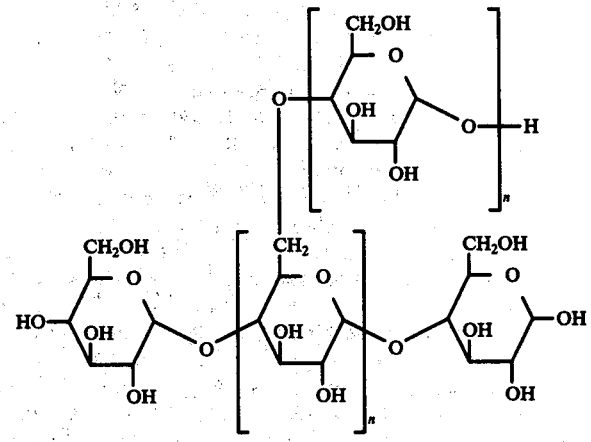

DETAILED DESCRIPTION

In comparison to starches that comprise high molecular weight polymeric chains of amylose and amylopectin, the hydrolyzed starches useful in preparing the dispersants of this invention comprise depolymerized chains of amylose and amylopectin which have average molecular weights ranging up to about 100,000 and more likely ranging up to about 80,000, e.g. ranging from about 400 to 80,000. The comparatively low molecular weight starches are obtained from the high molecular weight materials by known techniques. These starches, for example, are specifically illustrated in Table I wherein the average molecular weight was determined by gel permeation chromotography with polydextran standards and filtered deionized water as the carrier solvent. In addition to the materials recited in the Table, there are numberous other low molecular weight starches and various derivatives thereof with low degrees of substitution which can be used for purposes of this invention.

TABLE I

| Starch Materials | Type | D. E. | Supplier | Approx. Average Molecular Weight |
|---|---|---|---|---|
| Fro-Dex 42 | Dried corn syrup | 12 | American Maize-Products Co. | 600 |
| Fro-Dex 15 | Maltodextrin | 18 | American Maize-Products Co. | 16,000 |
| Amaizo 1736 | Dextrin | 4 | American Maize-Products Co. | 16,000 |
| Mor-Rex 1918 | Cereal solids | 10 | CPC International | 18,000 |
| Experimental Sample | Low D. E. Hydrolysate | 5 | American Maize-Products Co. | 35,000 |
| RL 5540 | Enzyme Hydrolysate | 0 | SW Laboratories | 86,000 |

While much attention has been given to the higher molecular weight starches, comparatively little has been done with the low molecular weight materials especially the low molecular weight starches with high degrees of substitution. There are many advantages in using the lower molecular weight starches and particularly important is the ability to control the solubility or hydrophilic character of the molecule which provides means of preparing highly concentrated aqueous solutions of workable viscosity. The hydrolyzed, low molecular weight starches may be more particularly characterized as comprising branched and linear anhydroglucose units but more likely consist essentially of linear or straight polymeric chains since many of the branched points were cleaved during hydrolysis.

It has been found in accordance with this invention that the low molecular weight starches which have been highly substituted by esterification can be used effectively as dispersants in aqueous systems and particularly in aqueous latex coatings. The properties of the hydrolyzed starch molecules can be controlled for the most part by the extent and type of acylation, i.e. by the ratio and type of monocarboxylic and dicarboxylic acid anhydrides. Starch, for example, is substantially a polymer of glucose having three reactive hydroxyl groups for each repeating unit (see the structure of amylose and amylopectin) and by converting all or substantially all of the hydroxyl groups of each anhydroglucose unit to ester groups the starch may be characterized as having a degree of substitution or D. S. value of 3.0. This is the maximum degree of substitution that can be obtained per anhydroglucose unit, but obviously lower degrees of substitution can be obtained by controlling the relative proportions of the reactants, i.e. the ratio of the hydrolyzed starch and the acylating agent. For purposes of this invention, the degree of substitution is essential and, therefore, must fall within the range of about 0.5 to 3.0 preferably is greater than 1.0. The D. S. value is therefor a means of characterizing the number of substituents, e.g. ester groups per anhydroglucose unit.

It is obvious that in addition to the hydrolyzed starch, various derivatives of hydrolyzed starch having a low degree of substitution, i.e. below about 0.1 can be used as the starting material in the esterification. These starch derivatives having a low degree of substitution can be used either alone or in combination, in any proportion, with the unsubstituted hydrolyzed starch in preparing the mixed starch esters of this invention.

Accordingly, it is an object of this invention to provide comparatively low molecular weight mixed esters of starch as dispersing agents for latex coatings. It is another object of this invention to provide low molecular weight mixed esters of starch having a high degree of substitution as a dispersant for pigments and resins in aqueous systems. It is another object of this invention to provide low molecular weight anionic mixed esters of starch having pendant carboxyl groups with variable hydrophilic/hydrophobic characteristics. It is a further object of this invention to provide aqueous coatings comprising esters of starch as dispersants to improve the hiding efficiency of the pigment.

More specifically, this invention relates to coating compositions generally referred to as latex paints, which comprises aqueous dispersions of from about 25 to 95 parts by volume and more likely 50 to 80 parts by volume of a polymeric resin binder, 5 to 75 parts and more likely 20 to 50 parts by volume of pigment, e.g. $TiO_2$, and a dispersing amount, i.e. ranging up to about 25% by weight of the pigment of a starch ester dispersant.

The dispersant consists of mixed esters of starch characterized as having pendant carboxylic acid groups with an average degree of substitution ranging from about 0.5 to 3.0 and wherein at least about 10 mole percent and preferably at least 50 mole percent of the pendant carboxylic acid groups are neutralized, e.g. from about 10 to 100 mole percent of the carboxyl groups are neutralized with an organic or inorganic compound. These mixed esters of starch are derived from (a) low molecular weight hydrolyzed starch molecules having a plurality of anhydroglucose units with average molecular weights ranging up to about 100,000 or a derivative of said hydrolyzed starch wherein the derivative is characterized as having a low degree of substitution, e.g. an ether derivative with a D. S. value below about 0.1 and (b) at least about 0.5 mole of acylating agent for each anhydroglucose unit of the hydrolyzed starch or of said hydrolyzed starch derivative. The acylating agent is a combination of anhydrides and acyl halides which consists of (i) from about 0.1 to 2.9 moles of at least one anhydride of a polycarboxylic acid and (ii) from about 0.1 to 2.9 moles of at least one agent selected from the class consisting of anhydride of monocarboxylic acids and the acyl halides of monocarboxylic acids. These dispersants have average molecular weights ranging up to 100,000, e.g. ranging from about 2000 to 80,000 and as low as 400 with an average degree of substitution greater than 0.5 and preferably greater than 1.0, e.g. ranging from about 1.0 to 3.0.

These starch ester dispersants may be used in variety of aqueous systems, but are particularly useful in aqueous coatings such as latex paints. The term "latex paints or coatings" as used herein means aqueous dispersions of generally water insoluble, film-forming polymeric resin binders. It is generally known, that latex paints contain various components including, for example, pigments, resin binders, emulsifying agents, surfactants, pH control agents, etc. and are referred to as emulsion paints, water-based paints or water-dilutable paints. The polymeric resin binders are generally present in the form of very fine particles and as the paint dries or cures, these particles coalesce forming the paint film. Thus, the compositions of this invention comprise aqueous dispersions of water-insoluble polymeric resin binders and particularly the acrylic resins together with a pigment and a dispersing amount based on the dry weight of the pigment of a dispersant consisting of the mixed starch esters of this invention.

The amount of pigment in the aqueous coating may range from about 5 to 75% by volume of the total amount of non-volatile materials (pigment volume concentration) and generally from about 20 to 50% by volume. The latex coatings are prepared by dispersing the polymeric resins in the aqueous phase together with the various other conventional coating ingredients. The polymer resins dispersed in the aqueous system consist of resin particles with average particle sizes ranging between 0.01 microns up to about 3.0 microns and generally between 0.1 and 1.0 micron. The continuous phase of the dispersion comprises water as the suspending medium which also may contain various amounts of organic solvent. These solvents are useful to adjust the viscosity, control the evaporation characteristics of the coating, provide stability, etc. In addition, the coatings may contain various surface active agents which help to stabilize the polymeric and pigment particles.

The solvents may include any of the water soluble or water miscible organic liquids generally used in latex paints and are usually present in amounts ranging up to about 40% if the aqueous dispersion. These liquids may include the various mono- and polyhydric alcohols such as the alkylene glycols, the glycol ethers or ether alcohols, the ketones and particularly the lower aliphatic alkylene alcohols and glycols such as ethyl alcohol, propyl alcohol, ethylene glycol, propylene glycol, butylene glycol, etc. The pigments dispersed in the aqueous system generally include the metal oxides such as titanium dioxide, zinc oxide, antimony oxide, zirconium oxide and various other pigments such as zinc sulfide, white lead, the silicates, carbon black, lithopone, the chromates such as lead chromate, the molybdates including molybdate orange and the organic pigments, such as phthalocyanine blue, phthalocyanine green, etc. In addition, various pigment extenders may be used such as calcium carbonate, silicates, talc, diatomaceous earth, silica, china clay, mica and any combination thereof.

The compositions of the resin binder is not particularly critical and, therefore, various polymers and copolymers may be used in the aqueous systems. Of particular interest, however, are the acrylics including the esters of acrylic and methacrylic acid wherein the ester groups contain up to 18 carbon atoms. The copolymers may include the acrylic monomers copolymerized with various aliphatic or aromatic olefins such as styrene, ethylene, propylene, butadiene, etc.

In addition to the acrylic polymers, various mixtures of the acrylics with Buna-S are useful for coating interior surfaces. In general, the polymeric resin binders useful in preparing the aqueous dispersions of this invention are well known in the art and, therefore, are not essential to the overall success of the coating. Thus, various polymeric resins and particularly those known to be useful in aqueous coatings can be used in the prescribed proportions with different pigments and the starch ester dispersant in accordance with this invention. In addition to the dispersion of pigment and polymeric binder, other components generally known as additives for coatings can be used. These include additives or modifiers such a sequestering agents, bactericides and various particulate water-insoluble, film-forming materials, etc.

The coatings of this invention may be applied by conventional methods to various substrates including, for example, house sidings and other weather exposed articles by known methods such as brushing, spraying, roller coating and the like. These substrates include various metals such as aluminum, wood, composition board, brick, stucco, etc.

In comparison to other modified starches, the low molecular weight startch esters of this invention are characterized as having a high degree of substitution in starch technology. The materials with low degrees of substitution are more common in that the D. S. values range anywhere from 0.0001 to about 0.05. These starches are not materially different, because of the low degree of substitution, from the unmodified starches and, therefore, they must be modified further to adjust the hydrophilic/hydrophobic charcteristics. Generally, the hydrophobicity of these starch esters increase as the degree of substitution increases as indicated by the solubility properties which change from a water-soluble, organic-insoluble at low degrees of substitution to water-insoluble, organic-soluble at high degrees of substitution. For example, starch esters having the necessary degree of substitution are esters which are insoluble in water but soluble in organic solvents or an alkaline aqueous media.

The raw starch materials utilized in preparing the mixed esters may be derived from various vegetable sources such as corn, wheat, rice, potatoes, grain, tapicoa, etc. These starches are predominantly and in some instances exclusively amylose or amylopectin or a mixture of these two types of molecules in various proportions. The high molecular weight starches are converted to the lower molecular weight, for purposes of this invention, by known processes, e.g. by exposing the starch molecules to acid, enzymes, heat, etc. under conditions of various concentrations, solvent, temperature and pressure.

As indicated, the low molecular weight starch molecules that have been derivitized before or after hydrolysis may be used either alone or in combination with the raw or unmodified starches as long as the degree of substitution of the starch derivative is below about 0.1. These starch derivatives may include, for example, starch ethers, starch esters, starch carbamates, etc. Preferred starch materials include the low molecular weight hydrolyzed starches and its derivatives which may be further characterized as having dextrose equivalent values ranging up to about 40 and more likely ranging up to about 30 as measured by the Luc-Schoorl method. Starch hydrolysates consist essentially of either linear or branched chains or in the alternative, have a distribution of species ranging from the linear, i.e. the straight chains or prevailing linear to the highly rearranged or branched chains. Specifically, these starch materials include the enzyme modified starches, the acid hydrolysates, the low D. E. hydrolysates, the dextrins and the various derivatives or modified hydrolysates as indicated herein, and other low molecular weight starches which are commercially available either as cereal solids, maltodextrins, dried syrups, thin-boiling starches, amylose fractions, etc. Any one or all of these low molecular weight starches and the derivatives thereof may be used and are hereinafter referred to by the term "low molecular weight hydrolyzed starches".

The anionic mixed esters of starch of this invention are characterized as having average molecular weights generally below 100,000, e.g. ranging up to about 80,000 and as low as 400. These starch esters have on an average a degree of substitution of at least about 0.5 but preferably greater than 1.0 wherein at least about 0.1, i.e. from about 0.1 to 2.9 of the total degree of substitution consist of ester linkages with pendant carboxylic acid groups derived from at least one anhydride of a polycarboxylic acid. Thus, the hydrolyzed starches (depolymerized starches) are reacted with at least about 0.5 mole of the acylating agent and upwards to about 3.0 moles plus a 10% to 20% excess for each anhydroglucose unit. Preferably, the acylating agent consists of (i) from about 0.3 to 2.3 moles of at least one anhydride of a polycarboxylic acid such as the anhydride of a dicarboxylic acid and (ii) from about 0.7 to 2.7 moles of at least one anhydride of a monocarboxylic acid, e.g. acetic anhydride and/or an acyl halide of the monocarboxylic acid. The anionic mixed esters of starch used as dispersants in accordance with this invention are prepared by reacting the low molecular weight hydrolyzed starch with the acylating agent in a liquid medium substantially free of water at temperatures ranging up to about 150° C, e.g. from about room temperature to about 115° C or from about 25° C to 85° C.

The anionic mixed esters of starch for purposes of this invention may be characterized further as having various substituents linked to the starch backbone such as the simple alkyl and/or aryl ester groups and the alkyl and/or aryl half-ester groups. These structures can be illustrated by specific starch esters having the following formulae:

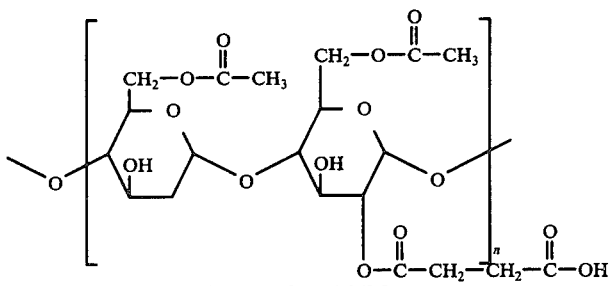

III. Starch Acetate-Succinate, D. S. = 1.0/0.5

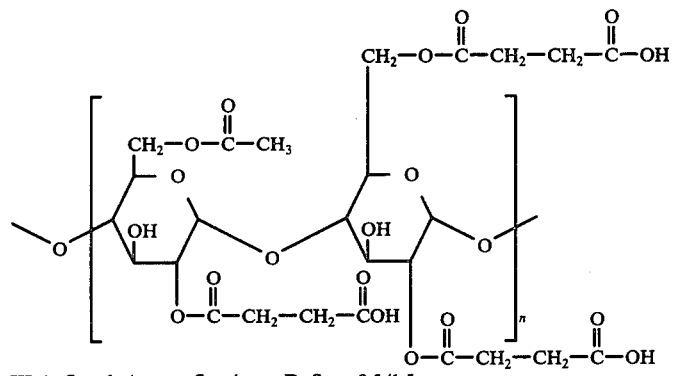

III A. Starch Acetate-Succinate, D. S. = 0.5/1.5

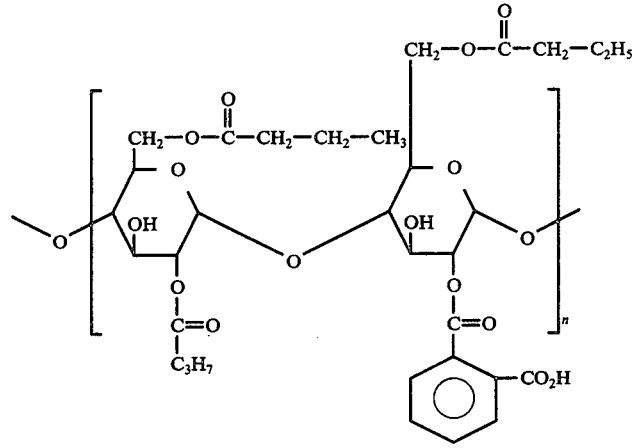

III B. Starch Butyrate-Phthalate, D. S. = 1.5/0.5

The carboxyl-containing aliphatic and/or aromatic mixed esters, i.e. anionic mixed esters as distinguished from other known esters have characteristics which make them unique particularly when compared with the simple esters, e.g. esters derived from the anhydrides of monocarboxylic acids. For example, the pendant carboxylic acid groups of the mixed esters are reactive sites for various crosslinking agents, e.g. amino compounds which are used in preparing thermosetting compositions. In addition, the carboxyl or acid groups are available for further derivitization, if needed, for the formation of inorganic or organic salts, amides, esters, etc. These pendant carboxyl groups may be completely or partially reacted, e.g. neutralized to various degrees with various inorganic metal compounds particularly the alkali and alkaline earth metal compounds such as sodium hydroxide, potassium hydroxide or with an amine by known methods.

While there are many different processes for esterifying starch as indicated by the literature, most of these are not satisfactory for this invention in that the processes involve direct esterification either in the presence of water or with an acid as distinguished from an anhydride. In the instant process, there are some limitations in the techniques by which the startch molecule can be modified and since the degree of substitution must be at least 0.5, the reaction must be carried out to substantially stoichiometric completion. Thus, esterification techniques known to be useful in preparing starches with lower degrees of substitution are not applicable in this process. More specifically, known processes are not satisfactory in that the presence of water or water-forming reactants, e.g. acids shift the reaction predominantly toward the starting material and, therefore, the highly substituted esters cannot be obtained. Moreover, the thermostability of starch is such that decomposition begins at a comparatively low temperature which generally means that mild thermo conditions must be employed. Reagents of low reactivity requiring elevated reaction temperatures cannot be used. In addition, the solubility and related properties of starch is such that is imposes a limitation on the choice of reaction procedures. For example, starch is soluble in pyridine, formamide and the like, but it is substantially insoluble in most organic solvents including the hydrocarbons. Since it is desirable to have a process which provides not only good control over the reaction but also provide products which can be reproduced, it is essential that the reaction medium contain solvents for the starch and the product.

Thus, for purposes of this invention, esterification of the hydrolyzed starch must take place in a reaction medium free of water or a medium which is substantially free of water and contains at least one solvent, e.g. pyridine or the like. A unique feature in utilizing pyridine is that is functions as a promotor in the formation of an intermediate which subsequently undergoes nucleophilic substitution. Esterification generally occurs readily and goes to a high percent of conversion even though in some instances there are some interferring factors, e.g. the presence of small amounts of moisture. Any water present reacts with the anhydride hydrolyzing it to its corresponding acid. The acids are very slow in reacting with the starch under the conditions required for this invention. Therefore, it may be necessary to add sufficient anhydride in excess of the stoichiometric amount, e.g. upwards up about 10 to 20% in order to consume the water that may be present in the starch.

In the preparation of the starch dispersants in accordance with this invention and particularly where aliphatic acylating agents are employed, it is advantageous to add the long chain anhydride first since it is less reactive and requires a longer reaction time and allows the lesser reactive anhydride to react with the more reactive hydroxyl groups of the starch. A portion of the shorter chain anhydride, e.g. acetic anhydrides may be added either before or together with the long chain anhydride which helps to consume any water in the starch.

A carboxyl-containing mixed aliphatic ester of starch having high D. S. values is derived, for example, from a combination of anhydrides, e.g. acetic and succinic anhydrides in a reaction medium containing pyridine as illustrated in the following example.

EXAMPLE A

| Reactants | Parts by Weight | Moles |
|---|---|---|
| Hydrolyzed Cereal Solids | 200 Total of | |
| | 194.8 Starch & | 1.20 |
| | 5.2 Water | 0.29 |
| Acetic Anhydride | 262.2 | 2.57 |
| Succinic Anhydride | 77.7 | 0.78 |
| Pyridine | 200.0 | |
| Starch Acetate-Succinate D. S. = 1.9/0.6 | | |

In the above example, the hydrolyzed starch was added to the reaction medium comprising pyridine and the resulting suspension was heated with stirring to temperatures ranging up to about 82° C until a clear solution was formed in approximately 30 minutes. The acetic anhydride was added over a period of about one hour while holding the temperatures at about 82° C. The reaction mixture was held at about 82° C for an additional hour to insure completion of the reaction and subsequently the succinic anhydride was added in small portions over approximately 30 minutes. The reaction mixture was again held at about 82° C for a period of about 4 hours to assure completion of the reaction. This procedure yields a homogeneous solution of starch esters in pyridine from which the esters may be separated by precipitating the pyridine solutions into a nonsolvent, e.g. a precipitating system comprising butanol and a hydrocarbon such as hexane, etc. Conversion of the hydrolyzed starch to the corresponding starch esters is substantially quantitative in that there are no major side reactions except for some losses due to impurities, loss of product during isolation, filtration, drying, handling, etc. Typical yields of the starch esters are illustrated in the data in Table ii.

TABLE II

| Ester of Starch | Calculated Degree of Substitution | Yield, % |
|---|---|---|
| Acetate-Succinate | 1.0/0.5 | 81 |
| Acetate-Succinate | 2.0/0.5 | 82 |

The mixed esters of starch in accordance with this invention contain both non-functional aliphatic and/or aromatic side groups and carboxyl-containing aliphatic and/or aromatic side groups, e.g. starch acetate-succinate or propionate-succinate, etc. as illustrated by Formula VI, wherein the D. S. value of each acylating agent is 1.0 for a total degree of substitution of 2.0.

FORMULA IV

-continued

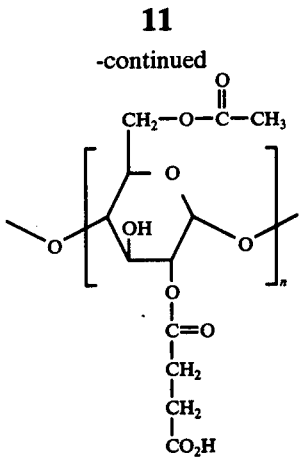

Esterification of the glucose unit proceeds in a random or statistical manner wherein each glucose unit is available for reaction with each anhydride group. The degree of substitution can readily be determined by various analytical methods and particularly by nuclear magnetic resonance spectra (NMR) of the esters not only to identify the structure, but also to determine the degree of substitution. It is further possible to quantitatively determine the degree of substitution of these starch esters by hydrolysis. Other methods of determining structure include the determination of the hydroxyl content, the acid values and the use of infrared data. Because the solubility of these esters occurs through ionic forces, they are inherently hydrophobic but may be used as dispersants in aqueous systems provided there is sufficient carboxyl functionality to obtain the necessary solubility.

Table III illustrates the range of carboxyl-containing mixed starch esters that can be prepared as dispersants in accordance with this invention. The data shows a wide range of carboxyl-containing aliphatic starch mixed esters ranging from a low aliphatic to a high carboxyl content to a high aliphatic to a low carboxyl content.

TABLE III

| Carboxyl Aliphatic Esters of Starch | |
|---|---|
| Ester | Calculated D. S. |
| Acetate-Succinate | 0.5/1.5 |
| Acetate-Succinate | 0.5/2.0 |
| Acetate-Succinate | 0.5/2.5 |
| Acetate-Succinate | 1.0/1.5 |
| Acetate-Succinate | 1.0/2.0 |
| Acetate-Succinate | 1.3/0.52 |
| Acetate-Succinate | 1.5/0.25 |
| Acetate-Succinate | 1.5/0.50 |
| Acetate-Succinate | 1.5/1.00 |
| Acetate-Succinate | 1.5/1.50 |
| Acetate-Succinate | 1.57/0.56 |
| Acetate-Succinate | 1.7/0.4 |
| Acetate-Succinate | 1.0/0.65 |
| Acetate-Succinate | 2.0/0.25 |
| Acetate-Succinate | 2.0/0.50 |
| Acetate-Succinate | 2.0/1.00 |
| Acetate-Succinate | 2.32/0.51 |
| Propionate-Succinate | 2.32/0.51 |
| Butyrate-Succinate | 2.32/0.51 |

As indicated, the mixed esters must contain a small, but effective number of carboxyl groups. For example, if only 0.5 of the three hydroxyl groups present in each of the anhydroglucose repeat units of the starch is reacted with the acylating agent, then the residue of the agent, i.e. anhydride is a carboxyl group resulting from opening the anhydride ring. It is important that at least about 0.1 of the total substitution, i.e. at least 0.1 of the 0.5 be derived from a polycarboxylic acid anhydride such as succinic anhydride. Thus, the mixed esters of starch can be characterized as having a degree of substitution of at least 0.5 and preferably 1.0 wherein at least about 0.1 of the total degree of substitution is derived from anhydrides of polycarboxylic acid and particularly from dicarboxylic acid anhydrides.

Although a particular mixed ester may be substantially insoluble in water, it can be made water soluble by the introduction of ionic groups to the molecules, e.g. by neutralizing the pendant carboxyl groups with a base such as an alkali metal compound. These neutralized esters can be solubilized in water as illustrated by Formula V:

FORMULA V

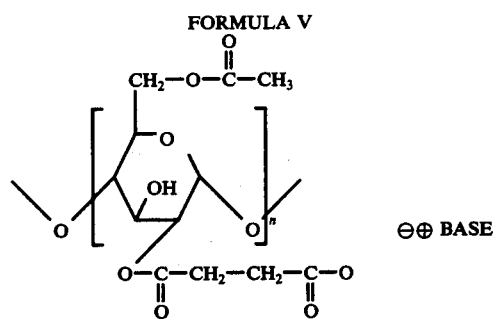

A proprionate-succinate starch ester was evaluated in a gloss exterior house paint as illustrated in Table IV. The data reveals that at the same levels the paint containing the starch ester had good hiding, gloss and scrub values.

TABLE IV

| Starch Ester Dispersants in Gloss House Paint No Glycols | | | |
|---|---|---|---|
| | Starch Propionate Succinate (RL 1754) | Tamol 731 | Standard with Tamol 731 |
| Gloss - 60° | 39 | 40 | 42 |
| 85° | 85 | 86 | 84 |
| Contrast Ratio | 0.967 | 0.972 | 0.968 |
| $S_6$ ($m^2$/g $TiO_2$) | 0.32 | 0.32 | 0.29 |
| Scrub, Cycles to Break | 60 | 60 | 256 |
| KU | 94 | 88 | 85 |
| ICI, poise | 0.55 | 0.50 | 0.9 |

The data in Table V illustrates the effects of the starch dispersant in comparison to the control (Tamol 731) in terms of hiding as measured by the efficiency of a gram of $TiO_2$ (i.e. $S_6$) in paint containing the starch ester dispersants. All paint formulations were prepared using a blender for dispersion, constant dispersion times and constant raw materials. These formulations were aged for three days prior to evaluation.

TABLE V

| Effect of Dispersant Level and Neutralizing Base on Hiding of Paints Based on Starch Ester Dispersant | | | | | | | |
|---|---|---|---|---|---|---|---|
| Example No.(a) | Dispersant (b) | Conc. %(c) | Neutr. Base | Contrast Ratio | $S_6$ (d) ($m^2$/g $TiO_2$) | pH | Viscosity |
| 1 | Tamol 731 | 0.50 | — | 96.7 | 0.30 | 8.4 | 90 |
| 2 | RL 4482 | 0.25 | NH$_4$OH | — | — | — | Soft Gel |

TABLE V-continued
Effect of Dispersant Level and Neutralizing Base on Hiding of Paints Based on Starch Ester Dispersant

| Example No.(a) | Dispersant (b) | Conc. %(c) | Neutr. Base | Contrast Ratio | $S_6$ (d) ($m^2$/g $TiO_2$) | pH | Viscosity |
|---|---|---|---|---|---|---|---|
| 3 | RL 4482 | 0.25 | NaOH | — | — | — | Soft Gel |
| 4 | RL 4482 | 0.50 | $NH_4OH$ | 96.4 | 0.33 | 9.0 | >143 |
| 5 | RL 4482 | 0.50 | NaOH | 95.0 | 0.34 | — | Soft Gel |
| 6 | RL 4482 | 1.00 | $NH_4OH$ | 96.6 | 0.32 | 8.7 | 95 |
| 7 | RL 4482 | 1.00 | NaOH | 96.8 | 0.34 | 8.5 | 87 |

(a) Average values obtained on three paints.
(b) Tamol 731, Rohm and Haas. RL 4482, starch butyrate (D.S. 1.3) - phthalate (D.S. 0.3) from cereal solids.
(c) Wt. % of total paint.
(d) Measured on Cary UV Spectrophotometer; average value of two films.

The starch ester dispersants were added to the formulations as an unneutralized solid during the preparation of the paint. Sufficient amounts of ammonia hydroxide were added to neutralize the carboxyl groups on the starch molecule and to solubilize the dispersant prior to addition of the pigments.

The data in Table VI illustrates the results obtained by using the control (Tamol 731) and two starch ester dispersants in a semi-gloss paint formula with 10% by weight of $TiO_2$ removed. Within experimental error, the hiding efficiency of a gram of $TiO_2$ ($S_6$ value) generally improved with the starch dispersants.

The data in Table VII illustrates a butyrate phthalate derivative of starch (cereal solids) as a dispersant in a semigloss paint formulation.

TABLE VI
Comparison of Starch Ester Dispersants in Semi-Gloss Paint Formulation with Reduced $TiO_2$ Levels

| Example No. (a) | Dispersant (b) | Conc. %(c) | $TiO_2$ Level | Contrast Ratio | Gloss 60° | Gloss 20° | $S_6$ (d) $m^2$/g $TiO_2$ | Hot Room (e) |
|---|---|---|---|---|---|---|---|---|
| 1 | Tamol 731 | 0.5 | Std. | 96.7 | 52.7 | 9.8 | 0.30 | Stable |
| 2 | Tamol 731 | 0.5 | −10% | 96.8 | 52.3 | 10.3 | 0.32 | Stable |
| 3 | Butyrate-Phthalate (RL 4482) | 1.0 | Std. | 96.8 | 46.6 | 6.8 | 0.34 | Stable |
| 4 | Butyrate-Phthalate (RL 4482) | 1.0 | −10% | 96.7 | 54.9 | 7.8 | 0.33 | Stable |

(a) Average values from three paints.
(b) Tamol 731, Rohm and Haas. RL 4482, derivative of cereal solids, D. S. 1.3/0.5.
(c) Wt. % based on solids.
(d) Measured on Cary U.V. Spectrophotometer, average value of two films.
(e) 120° F, two weeks.

TABLE VII
Starch Ester Dispersants in Semi-Gloss Paint

| Examples | Dispersant (a) | Starch Source | Gloss 60° | Gloss 20° | Contrast Ratio | $S_6$ (b) ($m^2$/g $TiO_2$) | Visc. (KU) | Freeze-Thaw Cycles (c) |
|---|---|---|---|---|---|---|---|---|
| 1 | Tamol 731 (Control) | — | 46.8 | 6.6 | 97.5 | 0.29 | 87 | — |
| 2 | Butyrate (1.3)-Phthalate (0.5) | Cereal Solids | 44.9 | 6.0 | 96.4 | 0.33 | >143 | — |
| 3 | Butyrate (1.3)-Phthalate (0.5) | Hydrolyzed high amylose starch | 26.5 | 2.3 | 97.8 | 0.29 | 91 | Pass 5 |
| 4 | Butyrate (1.3)-Phthalate (0.5) | Hydrolyzed hydroxy propylated high amylose starch | 42.5 | 5.1 | 97.7 | 0.31 | 89 | Pass 5 |

(a) All used at same level, 0.5 wt. % of solids.
(b) Measured on Cary UV Spectrophotometer.
(c) 24 hr. freeze, then thaw at R. T. equals one cycle.

The acylating agent, for purposes of this invention, consist of a combination of (i) an anhydride of at least one polycarboxylic acid, e.g. a dicarboxylic acid anhydride and (ii) an anhydride of at least one monocarboxylic acid and/or the acyl halide of said monocarboxylic acid, e.g. an acyl chloride. Thse anhydrides may have up to 36 carbon atoms and include the saturated or unsaturated aliphatic cycloaliphatic, heterocyclic and-/or aromatic mono and dianhydrides and particularly the mononhydrides. The acylating agent must contain at least one

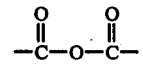

group or only one acyl halide group of a monocarboxylic acid, i.e. one

group wherein X is a halogen such as chlorine, bromine, etc. More specifically, the anhyrides of the monocarboxylic acids may be characterized by the formula:

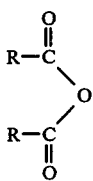

wherein R is a monovalent organic radical or substituted organic radical saturated or unsaturated selected from the class consisting of alkyl, aryl, alkaryl, aralkyl, cycloalkyl and heterocyclic radicals, e.g. radicals having up to 18 carbon atoms such as the lower aliphatic monocarboxylic acid anhydrides having 2 to 8 carbon atoms. These organic radicals may have one or more substituents selected from the class consisting of nitro, amino, carboalkoxy, e.g. carbomethoxy, lower alkoxy, e.g. methoxy, phenoxy and various other substituents which do not interfer with the acylation reaction.

Specific anhydrides of the monocarboxylic acids include the saturated anhydrides such as acetic anhydride, propionic anhydride, butyric andhydride, etc. The unsaturated anhydrides such as acrylic anhydride, the substituted acrylic anhydrides, crotonic anhydride, oleic anhydride, etc. The aromatic monocarboxylic acid anhydrides, such as phenylacetic acid anhydride and various other anhydrides of monocarboxylic acids, e.g. caproic anhydride, caproylic anhydride, palmitic anhydride, phenoxyacetic anhydride, lauric anhydride, heptylic anhydride, stearic anhydride, myristic anhydride, benzoic anhydride, the substituted benzoics such as sulfobenzoic anhydride, valeric anhydride, benzoylacetic anhydride, etc. As indicated, the acyl halides, e.g. chlorides of the carboxylic acids may be used, but must be limited to the monohalides such as benzoyl chloride, benzoyl bromide and various substituted benzoyl halides such as nitrobenzyl chloride and the acetyl halides such as acetyl chloride, acetyl bromide, acetyl iodide, etc. Other acyl halides include myristyl chloride, phenylacetyl chloride, propionyl chloride, butyryl chloride, capryl chloride, naphthyl chloride, oleoyl chloride, linoleoyl chloride, etc.

The anhydrides of the polycarboxylic acids include the aliphatic, aromatic, cycloaliphatic and heterocyclic anhydrides and specifically the ethylenically unsaturated polycarboxylic acid anhydrides such as maleic anhydride, fumaric anhydride, citraconic anhydride, itaconic anhydride, etc. Other anhydrides include the anhydrides of dicarboxylic acids such as succinic anhydride, the substituted succinic anhydrides such as octenylanhydride, suberic anhydride, glutaric anhydride and the various aromatic carboxylic acid anhydrides such as phthalic anhydride, isophthalic anhydride, terephthalic anhydride, tetrahydrophthalic anhydride, naphthenic anhydride, etc. Also included are the cycloaliphatic anhydrides such as 3-cyclohexene-1,2-dicarboxylic acid anhydride and particularly the cyclic carboxylic acid anhydrides wherein the anhydride group forms part of the ring, i.e. where the two carboxyl groups are adjacent to one another in the molecule or sufficiently close to enable an internal rearrangement of the two carboxyl groups to form the anhydride group. Still other anhyrides of polycarboxylic acids include metallic anhydride, trimellitic anhydrides and combinations thereof.

The dianhydrides are useful but not preferred and include the dianhydrides of tetracarboxylic acids such as pyromellitic dianhydride; benzophenone tetracarboxylic dianhydride; diphenyl tetracarboxylic dianhydride; 2,2-bis (3,4-dicarboxyphenyl) propane dianhydride; bis (3,4-dicarboxyphenol) ether dianhydride; bis (3,4-dicarboxyphenyl) sulfone dianhydride; bis (2,3-dicarboxyphenyl) methane dianhydride; naphthalene tetracarboxylic dianhydride; benzene-1,2,3,4-tetracarboxylic dianhydride, etc.

The carboxylic anhydrides may be obtained by dehydrating the corresponding acid by heating to temperatures above 70° C preferably in the presence of the dehydrating agent, e.g. acetic anhydride. Generally, the cyclic anhydrides are obtained from polycarboxylic acids having the acid radical separated by no more than three carbon atoms and preferably the acid radical is on adjacent carbon atoms such as succinic anhydride. The linear anhydrides are obtained from polycarboxylic acids having the acid radical separated by four or more carbon atoms. The acid halides of the monocarboxylic acid are prepared by reacting the acid with a halogenating agent such as phosphorous tribromide, phosphorous pentachloride, etc.

The reaction of the acylating agent with the starch takes place in an organic medium substantially free of water and preferably containing at least one organic liquid capable of functioning as a solvent for the reactants of the resulting products. The preferred solvents include amines such as the aliphatic, aromatic or cyclic amines having up to 20 carbon atoms and various substituted aliphatic, aromatic or cyclic amines and particularly the tertiary amines. The preferred tertiary amines are the pyridines, the homologs of pyridine, picolines, and quinolines such as benzyl pyridine, ethyl pyridine, butyl pyridine, phenyl pyridine, propyl pyridine, dimethyl pyridine, trimethyl pyridine, dimethyl diethyl pyridine, methodxy pyridine, the alkyl quinolines, e.g. trimethyl quinoline, phenyl quinoline, benzyl quinoline, methoxy quinoline, etc. In addition to the amino compounds other organic liquids or solvents include the formamides, such as dimethyll formamide, diethyl formamide, the acetamides such as diethyl acetamide, dimethoxy acetamide, the sulfoxides such as dimethyl sulfoxide, etc. Other organic solvents include, for example, the dioxanes, the nitriles such as benzonitrile and various aromatic or cycloaliphatic solvents such as benzene, xylene, toluene, cyclohexane, the ketones such as methylethyl ketone, acetone, the acetates such as methyl acetate, the glycol ethers, the aliphatic solvents such as hexane, octane, pentane and various combinations of these organic solvents in any proportion.

The following examples illustrate the preparation of low molecular weight hydrolyzed mixed starch esters useful as dispersants in accordance with this invention.

EXAMPLE B

Hydrolyzed Starch Butyrate-Phthalate D.S. = 1.8/0.5

Total D.S. 32 2.3

Approximately 166 parts by weight of hydrolyzed starch of low molecular weight having a D.E. value of 10 and containing approximately 2.6% by weight of moisture was suspended in 175 parts by weight of pyridine and then dissolved by agitating at temperatures ranging up to about 150° F. Approximately 323 parts by weight of butyric anhydride were added at a rate to maintain the reaction temperature below about 190° F. Following the addition of the butyric anhydride, the reaction mixture was held at the same temperature for several hours. Approximately 74 parts by weight of phthalic anhydride were added as a solid over approximately 1 hour and the reaction mixture was maintained at a temperature below about 200° F for a period sufficient to allow the reaction of the anhydride to go to completion. After cooling, the product was isolated from the pyridine solution by precipitation into an excess of water with rapid agitation. The solid obtained was washed and dried to obtain a high yield of mixed starch ester as a pure white powder.

EXAMPLE C

Hydrolyzed Starch Acetate-Maleate D.S. = 1.0/1.0

Total D.S. = 2.0

Approximately 166 parts by weight of hydrolyzed starch having a D. E. value of 9-11 and containing approximately 2.6% by weight of moisture was slurried in 180 parts by weight of dimethyl formamide and dissolved with agitation while raising the temperature to about 150° F. Approximately 127 parts by weight of acetic anhydride were added while holding the temperature below 190° F. When the anhydride addition was completed, the reaction mixture was held at a maximum of about 200° F for several hours. Approximately 90 parts by weight of maleic anhydride were added as a solid over about 1 hour while holding the reaction temperature below about 200° F. The reaction mixture was then held at this temperature for several additional hours and then cooled. The product was isolated by precipitation of the reaction mixture into an excess of a non-solvent, i.e. isobutanol.

EXAMPLE D

Hydrolyzed Starch Propionate-Succinate D.S. = 2.3/05

Total D.S. = 2.8

Approximately 250 parts by weight of a commercial hydrolyzed waxy maize starch having a dextrose equivalent or D. E. value of 5-6 and containing a low amount of ester substitution (less than D. S. = 0.1) was suspended in approximately 400 parts by weight of pyridine and then dissolved as recited in Example B. Propionic anhydride was added in amounts sufficient to obtain the desired degree of substitution and to consume any residual water in the starting material. Approximately 500 parts by weight of propionic anhydride was added over a 2 hour period while maintaining the temperature of about 180° F. After about 2 hours of mixing at 180° F, approximately 77 parts by weight of succinic anhydride was added over a 30 minute period as a solid. After approximately 2 hours of mixing at 180° F, the reaction mixture was cooled and the product was isolated by precipitation into a large excess of water. The product was washed and dried in a vacuum oven.

EXAMPLE E

Low Molecular Weight Dextrin-Acetate-Hexahydrophthalate D. S. = 0.5/1.0

Total D.S. = 1.5

Approximately 162 parts by weight, on a dry basis, of a commercially highly converted yellow dextrin having a D. E. value of about 5 was suspended in pyridine and dissolved as recited in Example B in approximately 175 parts by weight of pyridine. Acetic anhydride was added to the mixture to consume the residual water in the system and then about 51 parts by weight of acetic anhydride was added over a 2 hour period at a temperature of about 180° F. Following a 2 hour hold at 180° F, approximately 152 parts by weight of hexahydrophthalic anhydride was added over several hours while maintaining the same temperature. The reaction mixture was stirred for an additional two hours below a temperature of 200° F and then cooled. The product was isolated as a solid by precipitation into an excess of water adjusted to a pH of 2-3. The solids were collected, washed and dried to yield a solid mixed starch ester.

EXAMPLE F

Hydrolyzed Starch Butyrate-Anthranilate D.S. = 0.8/2.0

Total D.S. = 2.8

Approximately 50 parts by weight of hydrolyzed starch having a D. E. value of 10 and containing about 2.6% by weight of moisture was suspended in about 200 parts by weight of dimethyl formamide and dissolved with stirring while the temperature was raised to about 160° F. About 50 parts by weight of butyric anhydride was added over a 30 minute period while maintaining the temperature at 180° F. The reaction mixture was held at this temperature for about 2.5 hours and a solution of about 90 parts containing 98 parts by weight of isatoic anhydride and 400 parts by weight of dimethyl formamide was added to the reaction mixture dropwise over 1.5 hours at temparatures of 180° F. The reaction mixture was held at this temperature for several hours and then cooled. A mixed starch ester product was isolated by precipitation into an excess amount of water. The product obtained was washed and then dried.

EXAMPLE G

Enzyme Hydrolyzed Starch Butyrate-Phthalate, D.S. = 1.3/0.5

Total D.S. = 1.8

Whole cornstarch (50 g.) was suspended in 500 g. of water and the pH adjusted to 6.5 to 7.5 using sodium carbonate solution. Bacterial -amylose (AMYLIQ Concentrate, Wallerstein Co.) was added (0.15 g.) and the starch gelatinized at 175° C. After 1 hour hold at 175° F, the temperature was increased to 205° F and 80 g. of $H_2O$ removed by distillation over 45 minutes. The mixture was cooled to room temperature, protected with a bactericide, and poured into excess ethanol to isolate the product hydrolysate.

Approximately 25 parts by weight of the above enzyme hydrolyzed starch (D.E. = 0) containing ca 3% moisture was suspended in 200 parts pyridine and dissolved as recited in Example B. Approximately 37 parts by weight of butyric anhydride was added over 40 minutes at 180° F. The reaction mixture was held at 180° F for approximately 3 hours and then 11 parts by weight of phthalic anhydride were added as a solid. After an additional 3 hours hold at 180° F, the mixture was cooled and the product isolated by precipitation into cold water.

EXAMPLE H

Hydrolyzed Starch Acetate-Octenylsuccinate, D.S. = 0.2/0.5

Total D.S. = 0.7

Approximately 166 parts by weight of hydrolyzed starch of low molecular weight having a D. E. value of 10 and containing approximately 2.6% by weight of moisture was suspended in 175 parts by weight of pyridine and then dissolved by agitating at temperatures ranging up to 150° F. Approximately 45 parts by weight of acetic anhydride were added over 1 hour while maintaining the reaction temperature below 200° F. After 30 minutes hold, approximately 105 parts by weight of n-octenyl-succinic anhydride were added over one hour at temperatures below 200° F. The mixture was stirred an additional 1 hour at the same temperature and then cooled. The product was isolated by precipitation of the reaction mixture into cold water acidified to pH ca 2-3.

Of the various sources of starch having average molecular weights ranging up to about 100,000, a preferred material is a hydrolzyed starch commercially available as cereal solids which comprises approximately 20% hydrolyzed starch chains containing less than seven anhydroglucose repeat units and about 80% hydrolyzed starch chains with seven or more anhydroglucose repeat units. The average molecular weight of this hydrolyzed starch is such that solutions of pourable viscosity may be prepared in water or certain other organic solvent at a solids content of 50% or more.

In comparison to the high molecular weight low substituted starch esters, the highly substituted mixed starch esters of this invention provide many advantages, e.g. particularly with regard to solubility characteristics. For example, at any given degree of substitution, e.g. ranging from 0.5 to 3.0, the lower molecular weight mixed starch esters are soluble in a wider range of solvents. Moreover, the wide variation in the degree of substitution and the various types of ester groups allows the esters to be prepared with particular characteristics such that they may be designed for used in a specific blend of solvents ranging from water to organic liquids and various combinations of organic solvents and water. Solutions of pourable viscosity at a 50 to 60% solids content or higher are possible with the starch esters of this invention whereas the higher molecular weight esters result in solutions of substantially higher viscosity at a lower solids content. The combination of high solids and a low viscosity, made possible by these starch esters is of particular value in the coating arts where it is desirable to have a high concentration of polymer per volume of solvent. The mixed starch ester may be prepared to have a particularly solubility, reactivity, melting point, crystallinity, film-forming properties, permeability, etc. which for the most part can be altered by changing the degree of substitution and the relationship and/or ratios of the various anhydrides from which the esters are prepared.

While this invention has been described by a number of specific embodiments, it is obvious there are variations and and modifications which can be made without departing from the spirit and scope of the invention as set forth in the appended claims.

The invention claimed is:

1. A coating composition comprising an aqueous dispersion of from about 25 to 95 parts by volume of a polymeric resin binder, 5 to 75 parts by volume of pigment and a dispersing amount of dispersant consisting of mixed esters of starch characterized as having an average degree of substitution ranging from 0.5 to 3.0 wherein at least about 0.1 of total degree of substitution consists of ester groups having pendant carboxylic acid groups and at least about 10 mole percent of said pendant carboxylic acid groups are neutralized; said mixed esters of starch derived from a. low molecular weight hydrolyzed starch having a plurality of anhydroglucose units with average molecular weights ranging up to about 100,000 or a derivative of said hydrolyzed starch having a degree of substitution below about 0.1 and
   b. at least about 0.5 mole of acylating agent for each anhydroglucose unit of the hydrolyzed starch or the derivative thereof;

said acylating agent consisting of (i) from about 0.1 to 2.9 moles of at least one anhydride of a polycarboxylic acid and (ii) from about 0.1 to 2.9 moles of at least one agent selected from the class consisting of anhydrides of monocarboxylic acids and the acyl halides of monocarboxylic acids.

2. The coating composition of claim 1 further characterized in that the polymeric resin binder is present in an amount ranging from about 50 to 80 parts by volume and the pigment is present in an amount ranging from about 20 to 50 parts by volume.

3. The coating composition of claim 2 further characterized in that the dispersing amount of dispersant ranges from about 0.05 to 25% by weight of the pigment.

4. The coating composition of claim 2 further characterized in that the pigment is titanium dioxide and the dispersant is present in an amount ranging from about 1.0 to 10% by weight of the pigment.

5. The coating composition of claim 1 further characterized in that at least 50 mole percent of the pendant carboxylic acid groups are neutralized.

6. The coating composition of claim 5 further characterized in that the pendant carboxylic acid groups are neutralized with at least one inorganic metal compound.

7. The coating composition of claim 5 further characterized in that the pendant carboxylic acid groups are neutralized with at least one amine.

8. The coating composition of claim 1 further characterized in that the anhydride of the polycarboxylic acid is a cyclic dicarboxylic acid monoanhydride having at least four aliphatic carbon atoms per molecule.

9. The coating composition of claim 8 further characterized in that the anhydride or the polycarboxylic acid is a monoanhydride of a dicarboxylic acid having 4 to 20 carbon atoms per molecule.

10. The coating composition of claim 9 further characterized in that the anhydride is phthalic anhydride.

11. The coating composition of claim 1 further characterized in that the monocarboxylic acid anhydride is an aliphatic monocarboxylic acid anhydride having at least 2 carbon atoms per molecule.

12. The coating composition of claim 1 further characterized in that at least one of the anhydrides of the monocarboxylic acids is an aliphatic anhydride having 2 to 8 carbon atoms per molecule.

13. The coating composition of claim 1 further characterized in that the hydrolyzed starch comprises branched and linear anhydroglucose units and has a dextrose equivalent value ranging up to 40.

14. The coating composition of claim 1 further characterized in that the hydrolyzed starch consists essentially of linear anhydroglucose units.

15. The coating composition of claim 1 further characterized in that the mixed esters of starch have an average degree of substitution of at least 1.0 and an average molecular weight ranging from about 2,000 to 80,000.

16. The composition of claim 1 further characterized in that said mixed esters of starch are derived from (i) at least one monoanhydride of an aromatic dicarboxylic acid and (ii) at least one aliphatic monocarboxylic acid anhydride.

17. The coating composition of claim 1 further characterized in that said mixed esters of starch are derived from low molecular weight hydrolyzed starch having a plurality of anhydroglucose units with average molecular weights ranging up to about 80,000 and an average degree of substitution of at least 1.0 wherein at least 0.1 of the total degree of substitution consists of ester groups having pendant carboxylic acid groups derived from anhydrides of dicarboxylic acids.

18. A process for preparing aqueous coating compositions which comprises dispersing in an aqueous medium about 25 to 95 parts by volume of a polymeric resin binder and about 5 to 75 parts by volume of pigment with an effective amount of dispersant consisting of mixed esters of starch characterized as having an average degree of substitution ranging from 0.5 to 3.0 wherein at least about 0.1 of the total degree of substitution consists of ester groups having pendant carboxylic acid groups and at least about 10 mole percent of said pendant carboxylic acid groups are neutralized; said mixed esters of starch derived from
   a. low molecular weight hydrolyzed starch having a plurality of anhydroglucose units with average molecular weights ranging up to about 100,000 or a derivative of said hydrolyzed starch having a degree of substitution below about 0.1 and
   b. at least about 0.5 mole by acylating agent for each anhydroglucose unit of the hydrolyzed starch or the derivative thereof;
   said acylating agent consisting of (i) from about 0.1 to 2.9 moles of at least one anhydride of a polycarboxylic acid and (ii) from about 0.1 to 2.9 moles of at least one agent selected from the class consisting of anhydrides of monocarboxylic acids and the acyl halides of monocarboxylic acids.

19. The process of claim 18 further characterized in that an effective amount of the dispersant ranges from about 0.05 to 25% by weight of the pigment.

20. The process of claim 18 further characterized in that at least 50 mole percent of the pendant carboxylic acid groups are neutralized.

21. The process of claim 18 further characterized in that at least one of the anhydrides of the monocarboxylic acids is an aliphatic anhydride having 2 to 8 carbon atoms per molecule and the anhydride of the polycarboxylic acid is a cylic dicarboxylic acid monoanhydride having at least 4 carbon atoms per molecule.

22. The process of claim 18 further characterized in that the pigment is titanium dioxide and the dispersant is present in an amount ranging from about 1.0 to 10% by weight of the pigment.

* * * * *